US010405631B2

(12) United States Patent
Ayukawa et al.

(10) Patent No.: US 10,405,631 B2
(45) Date of Patent: Sep. 10, 2019

(54) LIGHT EMISSION SYSTEM AND PSEUDO NATURAL LIGHT EMISSION MEMBER

(71) Applicant: KANEKA CORPORATION, Osaka-shi, Osaka (JP)

(72) Inventors: Shigeru Ayukawa, Tokyo (JP); Katsuhiko Hayashi, Osaka (JP); Kuniharu Matsuda, Tokyo (JP)

(73) Assignee: KANEKA CORPORATION, Osaka-shi, Osaka (JP)

( * ) Notice: Subject to any disclaimer, the term of this patent is extended or adjusted under 35 U.S.C. 154(b) by 0 days.

(21) Appl. No.: 16/098,415

(22) PCT Filed: Apr. 21, 2017

(86) PCT No.: PCT/JP2017/016096
§ 371 (c)(1),
(2) Date: Nov. 1, 2018

(87) PCT Pub. No.: WO2017/191769
PCT Pub. Date: Nov. 9, 2017

(65) Prior Publication Data
US 2019/0150585 A1    May 23, 2019

(30) Foreign Application Priority Data

May 6, 2016    (JP) .................................. 2016-093339
Feb. 7, 2017    (JP) .................................. 2017-020182

(51) Int. Cl.
A45D 29/18    (2006.01)
A45D 31/00    (2006.01)
B29C 35/08    (2006.01)

(52) U.S. Cl.
CPC ............. *A45D 29/18* (2013.01); *A45D 31/00* (2013.01); *B29C 35/0805* (2013.01); *B29C 2035/0827* (2013.01)

(58) Field of Classification Search
CPC ...... A45D 29/18; A45D 31/00; B29C 35/0805
See application file for complete search history.

(56) References Cited

U.S. PATENT DOCUMENTS 6,518,583 B1    2/2003    Hennig
6,762,425 B1 *  7/2004    Strait ..................... A45D 29/00
                                                          250/455.11

(Continued)

FOREIGN PATENT DOCUMENTS

JP    2005158320 A    6/2005
JP       3181614 U    2/2013

(Continued)

OTHER PUBLICATIONS

International Bureau of WIPO, International Preliminary Report on Patentability Issued in Application No. PCT/JP2017/016096, dated Nov. 6, 2018, WIPO, 6 pages.

(Continued)

Primary Examiner — Nicole M Ippolito
Assistant Examiner — Sean M Luck
(74) Attorney, Agent, or Firm — Alleman Hall Creasman & Tuttle LLP

(57) ABSTRACT

Provided is a light illumination system that, when a short-wavelength light curable resin is applied onto a body to be decorated such as an artificial nail or a nail of a fingertip, easily identifies a coating condition and a color of the short-wavelength light curable resin. This light emission system includes a short-wavelength light emission member and a pseudo natural light emission member, wherein the short-wavelength light emission member has a short-wavelength light emitting source in a casing, the casing has inside an opening that allows insertion of the nail therethrough, the short-wavelength light emitting source irradiates a short-wavelength light curable resin with short-wavelength light having a wavelength less than 410 nm to cure the resin, the (Continued)

pseudo natural light emission member has a planar light source, and the planar light source is located outside the casing and is capable of emitting diffusion light.

12 Claims, 11 Drawing Sheets

(56) References Cited

U.S. PATENT DOCUMENTS

| | | | |
|---|---|---|---|
| 2007/0186949 A1* | 8/2007 | Boothe | A45D 29/00 132/285 |
| 2007/0223219 A1 | 9/2007 | Medendorp, Jr. et al. | |
| 2007/0268686 A1 | 11/2007 | Tokushita | |
| 2011/0277338 A1* | 11/2011 | Li | F26B 3/28 34/275 |
| 2014/0054472 A1 | 2/2014 | Tanihara et al. | |
| 2014/0300259 A1* | 10/2014 | Kim | A45C 5/005 312/226 |
| 2015/0290675 A1* | 10/2015 | Lin | A45D 29/00 250/494.1 |
| 2016/0076709 A1 | 3/2016 | Matsubayashi et al. | |

FOREIGN PATENT DOCUMENTS

| | | |
|---|---|---|
| JP | 2013212326 A | 10/2013 |
| JP | 2013248034 A | 12/2013 |
| JP | 2016024956 A | 2/2016 |
| WO | 2009011402 A1 | 1/2009 |

OTHER PUBLICATIONS

ISA Japan Patent Office, International Search Report Issued in Application No. PCT/JP2017/016096, dated Jun. 13, 2017. WIPO, 4 pages.

European Patent Office, Supplementary Partial European Search Report Issued in Application No. 17792702, Jul. 11, 2019, 1 page.

* cited by examiner

Example 1 — Reference Example 1 — Reference Example 2

LIGHT EMISSION SYSTEM AND PSEUDO NATURAL LIGHT EMISSION MEMBER

TECHNICAL FIELD

The present invention relates to a light emission system used for nail care services and the like in, for example, at a nail salon. The present invention also relates to a pseudo natural light emission member constituting the light emission system. The present invention also relates to a pseudo natural light emission member capable of accurately identifying an animal skin color or a human skin color.

BACKGROUND ART

Conventionally, in a nail salon, a practitioner such as a manicurist selects the color of a UV curable resin according to the color of the skin of a service receiver receiving nail care and applies a nail art to the nail of the service receiver.

More specifically, the practitioner such as a manicurist illuminates the nail of the practitioner with direct rays to light the fingertip using a lighting stand such as an LED, and coats the nail of the service receiver with the UV curable resin of the color selected according to the color of the skin of the service receiver. After the coating of the UV curing resin to a desired area of the nail of the service receiver is finished, the service receiver puts his/her nail into a dedicated UV emission device and the UV curable resin covering the nail is irradiated with UV light. Then, when the UV curable resin on the nail of the service receiver is cured, the practitioner selects a color of the UV curing resin and adjusts the color and pattern of the nail art, as necessary.

PRIOR ART DOCUMENTS

Patent Documents

Patent Document 1: JP 2013-248034 A
Patent Document 2: JP 2016-024956 A

DISCLOSURE OF INVENTION

Technical Problem

However, when the fingertip is irradiated with light using the LED light source which emits hard light having high directionality, light is locally concentrated, resulting in that the color may seem to be different from the actual color depending on the irradiation angle of light. This arises a problem such that the practitioner hardly identifies the actual color of the nail art applied to the service receiver, and thus, has difficulty choosing a UV curable resin to be applied next.

The practitioner decides the color, pattern, tint, or the like of the nail art, while comparing with the skin color of the service receiver as described above. Therefore, the practitioner needs to accurately identify the actual skin color with the naked eyes.

In view of the above, one of the objects of the present invention is to provide a light illumination system and a pseudo natural light emission member that allow a practitioner to easily identify an coating condition and color of a short-wavelength light curable resin when applied onto a body such as an artificial nail or a nail of the fingertip, and that allow the practitioner to easily cure the short-wavelength light curable resin on the body such as an artificial nail or a nail of the fingertip. One of the objects of the present invention is to provide a light illumination system and a pseudo natural light emission member capable of accurately identifying an animal skin color or a human skin color as compared with conventional cases.

Solution to Problem

One aspect of the present invention for solving the above-mentioned problems provides a light emission system for curing a short-wavelength light curable resin to constitute nail art onto an artificial nail or a nail of a fingertip, the system including: a short-wavelength light emission member; and a pseudo natural light emission member, wherein the short-wavelength light emission member includes a casing having a short-wavelength light emitting source therein, the casing having an opening that allows insertion of the artificial nail or the fingertip thereinto, wherein the short-wavelength light emitting source is configured to irradiate the short-wavelength light curable resin with a short-wavelength light to cure the resin when the artificial nail or the fingertip is inserted into the casing through the opening, the resin covering the artificial nail or the fingertip, the short-wavelength light having a wavelength less than 410 nm, and wherein the pseudo natural light emission member has a planar light source located outside the casing, the planar light source being configured to emit diffusion light.

The "nail of the fingertip" as referred to herein means a nail of a service receiver receiving nail care or an artificial nail provided to the fingertip of the service receiver.

According to this aspect, the planar light source of the pseudo natural light emission member is located outside the casing of the short-wavelength light emission member and is capable of emitting diffusion light, whereby a nearby area of the artificial nail or the nail of the fingertip can be illuminated with soft light when the short-wavelength light curable resin is applied to the artificial nail or the nail of the fingertip. Therefore, a difference in vision is less likely to occur depending on an irradiation angle of the diffusion light, and thus, an coating condition or color of the short-wavelength light curable resin is easily identified.

According to this aspect, when the short-wavelength light curable resin applied onto the artificial nail or the nail of the fingertip is cured, the artificial nail or the fingertip is inserted into the casing from the opening and irradiated with short-wavelength light from the short-wavelength light emitting source to cure the short-wavelength light curable resin. Thus, a nail art can be applied by a sequence of steps.

In a preferred aspect, the casing has on its outer surface a placement portion that allows the artificial nail or the fingertip to be placed, and the planar light source is configured to irradiate the artificial nail or the nail of the fingertip with diffusion light when the artificial nail or the fingertip is placed on the placement portion.

According to this aspect, a practitioner can easily perform the coating step.

It is preferable that, in the above preferred aspect, the planar light source is disposed on a projection plane in the vertical direction of the artificial nail or the nail of the fingertip in a state where the artificial nail or the fingertip is placed on the placement portion.

According to this aspect, the artificial nail or the nail of the fingertip is less likely to be shaded by the shadow of the hand of the practitioner, which can further reduce the influence of shadows.

In a preferred aspect, the pseudo natural light emission member includes at least two of the planar light sources including a first and a second planar light sources, and the first planar light source is configured to irradiate the short-wavelength light curable resin with diffusion light from a direction different from an irradiation direction of the second planar light source.

According to this aspect, diffusion light can be emitted from two directions, whereby a shadow is less likely to appear at the hand of the practitioner, and thus, the artificial nail or the nail of the fingertip is less likely to be hidden in the shadow at the hand of the practitioner. Therefore, the practitioner is easy to perform treatment.

It is preferable that, in the above aspect, the nail art is any one of gel nail, sculpture, nail polish, and gel polish.

In a preferred aspect, the planar light source has a general color rendering index Ra of 80 or more according to JIS Z 8726.

According to this aspect, due to the planar light source having high color rendering properties, the short-wavelength light curable resin or hardened nail art on the artificial nail or the nail of the fingertip can be checked in a color close to a color when the artificial nail or the nail of the fingertip is irradiated with sunlight. Therefore, a nail art in consideration of the actual color can be provided. In addition, the planar light source has high color rendering properties, and thus, is easy on the eyes and can reduce eye fatigue of the practitioner seeing the short-wavelength light curable resin, or the hardened nail art on the artificial nail or the nail of the fingertip.

In a preferable aspect, the short-wavelength light curable resin is an ultraviolet light curable resin, and diffusion light from the planar light source does not include light having a wavelength less than 350 nm, and equal to or more than 1000 nm.

According to this aspect, the diffusion light from the planar light source does not include light having a wavelength less than 350 nm. With this configuration, the short-wavelength light curable resin is hardly cured during coating of the short-wavelength light curable resin onto the artificial nail or the nail of the fingertip. Further, this configuration is easy on the eyes of the practitioner or the like.

According to this aspect, the diffusion light from the planar light source does not include light having a wavelength of 1000 nm or more. Therefore, during irradiation of the diffusion light, the artificial nail or the nail of the fingertip is less likely to be hot due to heat radiation, which can prevent the service receiver from suffering from burn injury. In addition, the hand of the practitioner is less likely to be hot with the diffusion light from the planar light source, and thus, the practitioner can comfortably apply nail treatment.

In a preferable aspect, the short-wavelength light curable resin is an ultraviolet light curable resin, and the short-wavelength light emitting source is configured to emit ultraviolet light having a wavelength less than 350 nm.

In the above aspect, the planar light source is preferably an organic EL panel.

In a preferable aspect, the casing has thereon or thereabove a placement portion that allows the artificial nail or the fingertip to be placed, the pseudo natural light emission member has a facing portion that faces the placement portion across a space, the facing portion supports the planar light source, the space allows insertion of the artificial nail or the fingertip, and the planar light source is configured to irradiate the artificial nail or the fingertip with diffusion light when the artificial nail or the fingertip is inserted into the space.

According to this aspect, the diffusion light can be emitted with the artificial nail or the fingertip being inserted into the space between the placement portion and the facing portion, whereby the artificial nail or the nail of the fingertip is less likely to be shaded by a shadow of the facing portion supporting the planar light source, and thus is hardly affected by shadows.

In a preferable aspect, the pseudo natural light emission member includes: at least two of the planar light sources including a first and a second planar light sources; the facing portion; and a leg that supports the facing portion, the facing portion supporting the first planar light source, the leg supporting the second planar light source, the first and the second planar light sources being configured to irradiate the artificial nail or the nail of the fingertip with diffusion light when the artificial nail or the fingertip is inserted into the space.

According to this aspect, the artificial nail or the nail of the fingertip is less likely to be shaded by shadows of the facing portion and the leg which support the planar light sources, and thus, is hardly affected by the shadows.

In a preferable aspect, the planar light source is detachable from and attachable to the facing portion.

According to this aspect, the planar light source can be easily replaced during maintenance and the like.

One aspect of the present invention provides a light emission system for curing a short-wavelength light curable resin to constitute a decorative object onto a target body, the system including: a short-wavelength light emission member; and a pseudo natural light emission member, wherein the short-wavelength light emission member includes a casing having a short-wavelength light emitting source therein, the casing having an opening that allows insertion of the target body thereinto, wherein the short-wavelength light emitting source is configured to irradiate the short-wavelength light curable resin with a short-wavelength light to cure the resin when the target body is inserted into the casing through the opening, the resin covering the target body, the short-wavelength light having a wavelength less than 410 nm, and wherein the pseudo natural light emission member has a planar light source located outside the casing, the planar light source being configured to emit diffusion light.

According to this aspect, a nearby area of the target body can be illuminated with soft light when the short-wavelength light curable resin is applied onto the target body. Therefore, a difference in vision depending on an irradiation angle of the diffusion light is less likely to occur, and thus, an coating condition or color of the short-wavelength light curable resin is easily identified.

Further, according to this aspect, when the short-wavelength light curable resin applied onto the body to be decorated is cured, the body to be decorated is inserted into the casing from the opening and irradiated with short-wavelength light from the short-wavelength light emitting source to cure the short-wavelength light curable resin. In this way, a nail art can be applied.

Meanwhile, a light source including an organic EL element has recently attracted attention as a light source having high color rendering properties. For example, Patent Document 2 discloses an organic EL element provided with a plurality of light-emitting units, which includes, between a cathode and an anode, a light-emitting layer made of an organic compound. According to Patent Document 2, white light obtained by the light emission of the plurality of light-emitting units has a continuous emission spectrum S over a wavelength region of 380 nm to 780 nm. The light emission spectrum S has one peak wavelength p1 in a red wavelength region R of 600 nm to 780 nm, two peak wavelengths pX and pY in a green wavelength region G of 490 nm to 600 nm, and two peak wavelengths p3 and p4 in a blue wavelength region B of 380 nm to 490 nm.

The organic EL element having such a spectrum can obtain white light having a wide range of color temperature and high color rendering properties, and therefore, is considered to be particularly suitable as a light source of an illumination device.

The organic EL element in Patent Document 2 is excellent as a light source that emits white light with high color rendering properties as diffusion light, and is attractive as a light source of a lighting system that makes it easy to identify the color or the like of a nail art.

However, such organic EL element is unsuitable for clearly identifying a skin color with high recognition performance with a simple configuration without being affected by the skill of the practitioner or difference in individual elements and without requiring a very high skill of the practitioner for identifying skin color, when the practitioner chooses a color of a UV curable resin according to the skin color of a service receiver receiving nail care. This is because such organic EL element has a complex configuration such that "the spectrum has two peak wavelengths p3 and p4 in the blue wavelength region B" as described above. Therefore, such organic EL element needs further improvement.

In view of this, the present inventors have studied light reflection characteristics of human skin in order to obtain a light emission system that can clearly and distinctly identify a skin color with a simpler configuration than conventional devices because the system is considered to become increasingly important in a beauty care field and a medical field with the expectation to be in high demand in the future. As a result of the study, the present inventors have found that it is important to achieve a light emission system capable of emitting a specific spectrum corresponding to light reflection characteristics of melanin and oxygenated hemoglobin contained in the skin, and have reached completion as one aspect of the present invention. The details are as follows.

Graphs in FIGS. 11A and B show reflection spectra of palms of the Finnish (Caucasian), Nepalese (Asian), and African (Black). In FIGS. 11A and B, values of data items in K. S. Bersha et al., SPECTRAL IMAGING AND ANALYSIS OF HUMAN SKIN (Univ Eastern Finland June 2010, CIMET) are plotted. In the graphs in FIGS. 11A and B, the Finnish (Caucasian) is indicated by "O", Nepalese (Asian) by "Δ", and African (Black) by "X".

As can be seen from FIGS. 11A and B, the skin color difference occurs in the wavelength range (short wavelength region) of less than 480 nm and the wavelength range (long wavelength region) exceeding 580 nm, but is not stable. On the other hand, such difference is relatively stable in the wavelength range from 480 nm to 580 nm. The reason for such a result is apparent from graphs in FIGS. 12A and B showing relative reflection spectra in which the oxygenated hemoglobin is indicated by a solid line and the melanin is indicated by a broken line. That is, having high concentration of oxygenated hemoglobin in the skin corresponds to having a good complexion, but in this case, reflectance becomes high in the long wavelength region exceeding 580 nm, and absorptivity becomes high in the short wavelength region of less than 480 nm. For this reason, it is considered that the influence of the difference in oxygenated hemoglobin concentration becomes unstable and unclear. It is considered that the influence of the difference in oxygenated hemoglobin concentration is stably and clearly observed within the range from 480 nm to 580 nm where medium reflectance and medium absorptivity are maintained. The melanin concentration in the skin corresponds to the color intensity. In the short wavelength region of less than 480 nm, the absorptivity is high, so that the influence of the difference in melanin concentration is not clear. It is considered that the most influence of the difference in melanin concentration appears within the wavelength range from 480 nm to 580 nm where medium reflectance is maintained.

From the above, in order to more clearly observe the difference in color of the skin, in particular the difference in complexion in a medical field and the difference in color density in a beauty care field, emission of light having a stable spectrum within a wavelength range from 480 nm to 580 nm inclusive is necessary. Further, the spectrum desirably has a simple spectrum structure in a wavelength region (short wavelength region) of less than 480 nm and a wavelength region (long wavelength region) exceeding 580 nm. Specifically, it is considered to be desirable that the spectrum has less number of maximum values, that is, less number of peaks, in the wavelength region of less than 480 nm and in the wavelength region exceeding 580 nm in order to clearly recognize the difference described above.

One aspect of the present invention derived as a result of the study described above provides a light emission system including a pseudo natural light emission member including one or more planar light sources, the planar light source being configured to emit diffusion light, wherein the pseudo natural light emission member is configured to irradiate an animal skin or a human skin with light, the light having a synthetic spectrum obtained by synthesizing an identification spectrum and a pseudo natural light forming spectrum, wherein the identification spectrum has a maximum intensity MAX and a minimum intensity MIN in a blue-green to green wavelength range of 480 nm to 580 nm, wherein the identification spectrum has a fluctuation range of an irradiation intensity represented by the following (Expression 1) not more than 0.5, wherein the pseudo natural light forming spectrum has one peak in a blue wavelength range of 430 nm to 480 nm and another peak in a red wavelength range of 580 nm to 680 nm, and wherein a maximum peak intensity PEAK in the red wavelength range satisfies the following (Expression 2):

[Equation 1]

Fluctuation range=2×(MAX−MIN)/(MAX+MIN)  (Expression 1);

and

[Equation 2]

PEAK>MAX  (Expression 2).

This aspect enables emission of white light having a simple and plain spectral structure and having a strong spectrum in which an intensity, corresponding to the reflection characteristics of melanin and oxygenated hemoglobin, in the range of 480 nm to 580 nm is stable. Therefore, a human skin color can be clearly and distinctly recognized under natural light. According to this aspect, when selecting a nail gel color according to the skin color, for example, a manicurist can clearly recognize the skin color and can apply a nail art more beautifully. Further, in the medical field, when a nurse visually checks a patient's condition, precision in the visual check can be improved.

In the above aspect, it is preferable that one of the planar light sources is an organic EL panel and has a color rendering index CRI of 80 or more according to CIE 13.3, and in the emission spectrum of the diffusion light, an intensity A (W/nm) at 480 nm is 0.8 times or more and 1.2 times or less, comparing to an intensity B (W/nm) at 580 nm.

According to this aspect, a performance for recognizing the skin color can be further improved.

In the above aspect, it is preferable that the organic EL panel serving as the one planar light source includes an organic EL element that forms the pseudo natural light forming spectrum, wherein the organic EL element includes, between an anode electrode layer and a cathode electrode layer, three light-emitting units which are electrically connected in series via a connection layer, the connection layer injects electrons into a light-emitting unit in contact with an anode side and injects holes into a light-emitting unit in contact with a cathode side, a first light-emitting unit among the three light-emitting units has an emission spectrum having the peak in the blue wavelength range, a second light-emitting unit has an emission spectrum having one peak that is a maximum intensity in the wavelength range of 460 nm to 530 nm, and a third light-emitting unit has an emission spectrum having the peak in the red wavelength range and one peak which is a maximum intensity in the green wavelength range of 530 nm to 580 nm.

In the above aspect, it is preferable that the second light-emitting unit has an emission spectrum having one peak that is a maximum intensity in the blue-green wavelength range of 480 nm to 530 nm.

According to this aspect, a high skin-color recognition performance can be ensured by using only one organic EL panel.

In the above aspect, it is preferable that the pseudo natural light emission member has at least two planar light sources, wherein one of the two planar light sources is capable of emitting diffusion light which has a spectrum having the peak in the blue wavelength range and the peak in the red wavelength range, and the other planar light source is capable of emitting diffusion light which has a spectrum having one peak that is a maximum intensity in the blue-green to green wavelength range.

According to this aspect, illumination can be provided with the skin-color recognition performance being adjusted.

In the above aspect, it is preferable that a light emission system for curing a short-wavelength light curable resin to constitute nail art onto an artificial nail or a nail of a fingertip, the system including a short-wavelength light emission member, wherein the short-wavelength light emission member includes a casing having a short-wavelength light emitting source therein, the casing having an opening that allows insertion of the artificial nail or the fingertip thereinto, wherein the short-wavelength light emitting source is configured to irradiate the short-wavelength light curable resin with a short-wavelength light to cure the resin when the artificial nail or the fingertip is inserted into the casing through the opening, the short-wavelength light having a wavelength less than 410 nm, and wherein the planar light source is located outside the casing.

According to this aspect, when a short-wavelength light curable resin is applied onto a body to be decorated such as an artificial nail or a nail of the fingertip, an coating condition and color of the short-wavelength light curable resin are easily identified, and the short-wavelength light curable resin on the body to be decorated such as an artificial nail or a nail of the fingertip can be cured.

One aspect of the present invention provides a pseudo natural light emission member attached to a short wavelength light emission member, wherein the short-wavelength light emission member includes a casing having a short-wavelength light emitting source therein, the short-wavelength light emission member curing a short-wavelength light curable resin covering an artificial nail or a nail of a fingertip, wherein the short-wavelength light emission member has a placement portion on a outer surface of the casing, the placement portion allowing the artificial nail or the fingertip to be placed on the placement portion, wherein the pseudo natural light emission member has a planar light source, and wherein the planar light source is configured to irradiate the artificial nail or the nail of the fingertip with diffusion light when the artificial nail or the fingertip is placed on the placement portion.

According to this aspect, a nearby area of the artificial nail or the nail of the fingertip can be illuminated with soft light when the short-wavelength light curable resin is applied onto the artificial nail or the nail of the fingertip. Therefore, a difference in vision is less likely to occur depending on an irradiation angle of the diffusion light, and thus, an coating condition or color of the short-wavelength light curable resin is easily identified.

Further, according to this aspect, diffusion light can be emitted from the planar light source with the artificial nail or the fingertip being placed on the placement portion formed on the outer surface of the casing of the short-wavelength light emission member, whereby the practitioner can easily perform treatment.

One aspect of the present invention provides a pseudo natural light emission member attached to a short wavelength light emission member, wherein the short-wavelength light emission member includes a casing having a short-wavelength light emitting source therein, the short-wavelength light emission member curing a short-wavelength light curable resin covering an artificial nail or a nail of a fingertip, wherein the pseudo natural light emission member includes at least two planar light sources including a first and a second planar light sources, and wherein the first planar light source is configured to irradiate the short-wavelength light curable resin with diffusion light from a direction different from an irradiation direction of the second planar light source.

According to this aspect, a nearby area of the artificial nail or the nail of the fingertip can be illuminated with soft light when the short-wavelength light curable resin is applied onto the artificial nail or the nail of the fingertip. Therefore, a difference in vision is less likely to occur depending on an irradiation angle of the diffusion light, and thus, an coating condition or color of the short-wavelength light curable resin is easily identified.

According to this aspect, diffusion light can be emitted from two directions, whereby a shadow is less likely to appear at the hand of the practitioner, and thus, the artificial nail or the nail of the fingertip is less likely to be hidden in the shadow at the hand of the practitioner. Therefore, the practitioner can easily perform treatment.

The above aspect relates to a light emission system capable of irradiating a human skin with illumination light for achieving a high recognition performance of the human skin under natural light, the system including a pseudo natural light emission member, wherein the pseudo natural light emission member has a planar light source capable of emitting diffusion light, wherein the pseudo natural light emission member is capable of irradiating the skin with light having a spectrum obtained by synthesizing an identification spectrum and a pseudo natural light forming spectrum, wherein the identification spectrum has a maximum intensity MAX (W/nm) and a minimum intensity MIN (W/nm) in a blue-green to green wavelength range (480 nm to 580 nm) and has a fluctuation range of an irradiation intensity represented by the abovementioned (Expression 1) being 0.5 or less, and the pseudo natural light forming spectrum has one peak each in a blue wavelength range (430 nm to 480 nm) and in a red wavelength range (580 nm to 680 nm), wherein an intensity of the peak in the red wavelength range is the maximum which is PEAK (W/nm) and satisfies the abovementioned (Expression 2).

Effect of Invention

According to the present invention, when a short-wavelength light curable resin is applied onto a body to be decorated such as an artificial nail or a nail of the fingertip, an coating condition and color of the short-wavelength light curable resin are easily identified, and the short-wavelength light curable resin on the body can be easily cured.

According to the present invention, an animal skin color or a human skin color can be accurately identified as compared with the conventional cases.

BRIEF DESCRIPTION OF DRAWINGS

FIGS. 7A and 7B are an explanatory view of a usage example of the light emission system in the first embodiment of the present invention, wherein FIG. 7A is a cross-sectional view showing an coating step and FIG. 7B is a cross-sectional view showing a curing step.

BEST MODE FOR CARRYING OUT THE INVENTION

Figure 1:
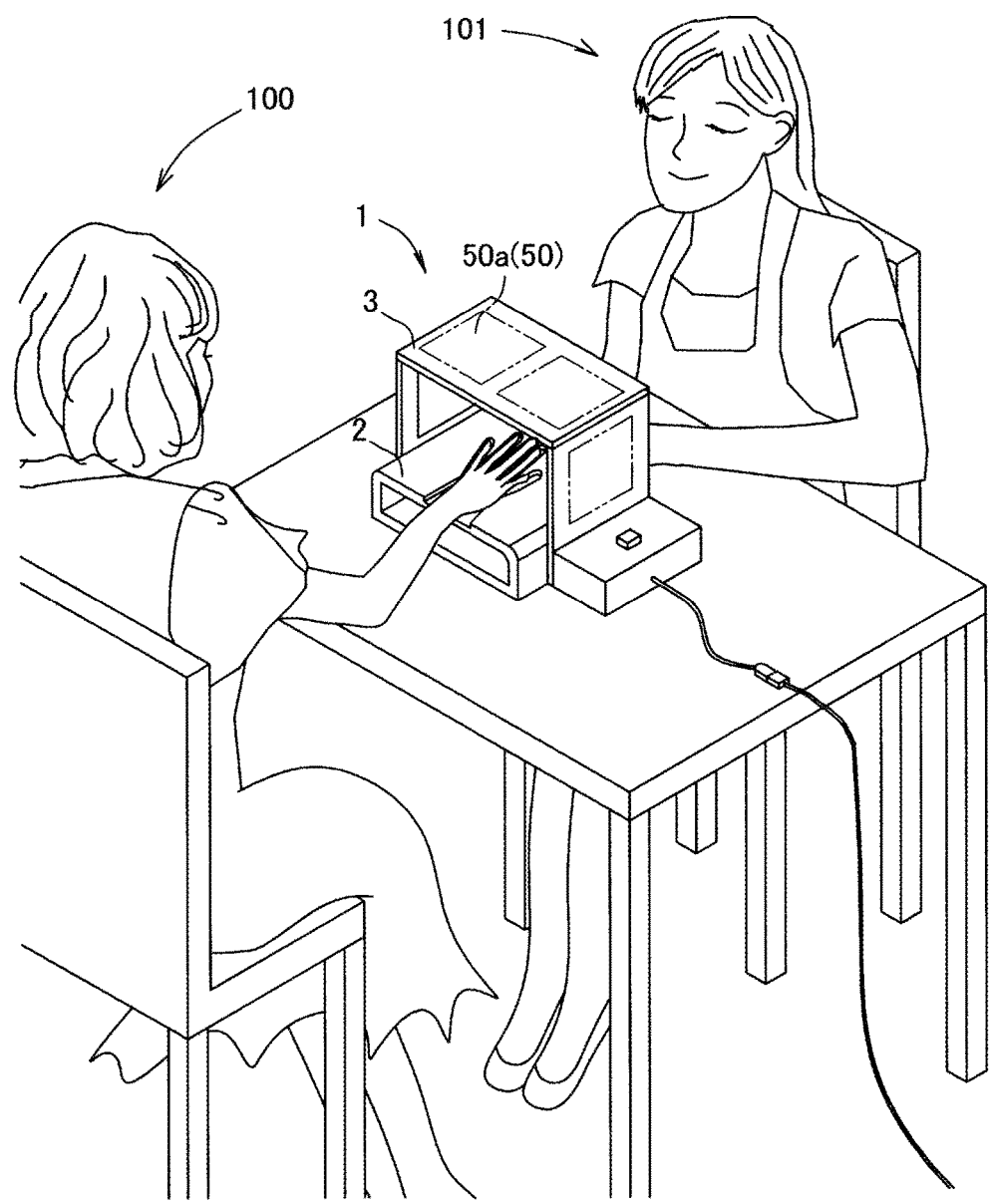
FIG. 1 is a perspective view schematically showing a usage of a light emission system according to a first embodiment of the present invention.

First, a light emission system which is one aspect of the present invention will be described in detail as follows.

(Light Emission System)

The light emission system is an illumination-light emission system having a high skin-color recognition performance, and is capable of irradiating an animal skin or a human skin with illumination light for achieving high recognition of the animal skin color or the human skin color under natural light. One of the features of the light emission system is that the system includes a specific pseudo natural light emission member.

(Pseudo Natural Light Emission Member)

Preferably, the pseudo natural light emission member includes one or more planar light sources capable of emitting diffusion light and is capable of emitting light having a synthetic spectrum obtained by synthesizing an identification spectrum and a pseudo natural light forming spectrum described later.

It is more preferable that, in the pseudo natural light emission member, at least one planar light source among the planar light sources described above is an organic EL panel.

It is still more preferable that the organic EL panel has a color rendering index CRI of 80 or more according to CIE 13.3, and that, in an emission spectrum of the organic EL panel, an intensity A (W/nm) at 480 nm is 0.8 times of or more than, and 1.2 times of or less than an intensity B (W/nm) at 580 nm.

It is particularly preferable that the organic EL panel includes an organic EL element having a high skin-color recognition performance and a pseudo natural light forming function described later.

The pseudo natural light emission member includes at least two planar light sources.

One planar light source out of these two planar light sources is a pseudo natural light forming planar light source and preferably has a spectrum having a peak in a blue wavelength range and a peak in a red wavelength range. The other planar light source of these two planar light sources is a skin-color highly-recognizable planar light source and preferably has a spectrum having one peak which is a maximum intensity in a blue-green to green wavelength range. These planar light sources may be the above-described organic EL panel.

(Identification Spectrum)

The identification Spectrum is for mainly improving skin color identification. It has a maximum intensity MAX (W/nm) and a minimum intensity MIN (W/nm) in a blue-green to green wavelength range (480 to 580 nm), wherein the fluctuation range of an irradiation intensity represented by the following (Expression 1) is 0.5 or less.

[Equation 3]

$$\text{Fluctuation range} = 2 \times (MAX - MIN)/(MAX + MIN) \quad \text{(Expression 1)}$$

(Pseudo Natural Light Forming Spectrum)

The pseudo natural light forming spectrum is for mainly forming pseudo natural light.

The pseudo natural light forming spectrum has one peak each in a blue wavelength range (430 nm to 480 nm) and in a red wavelength range (580 nm to 680 nm), wherein an intensity of the peak in the red wavelength range is the maximum which is PEAK (W/nm) and satisfies the following (Expression 2).

That is, the pseudo natural light forming spectrum has one peak in the blue wavelength range (430 nm to 480 nm) and one peak in the red wavelength range (580 nm to 680 nm), and the maximum peak intensity PEAK (W/nm) in the red wavelength range is higher than the maximum intensity MAX (W/nm) of the identification spectrum.

[Equation 4]

PEAK>MAX  (Expression 2)

(Organic EL Element)

The organic EL element has a high skin-color recognition performance and a pseudo natural light forming function.

The organic EL element has first to third light-emitting units between an anode electrode layer and a cathode electrode layer, and these units are electrically connected in series via a connection layer.

Here, the connection layer injects electrons into a light-emitting unit in contact with an anode side and injects holes into a light-emitting unit in contact with a cathode side. That is, the connection layer has a function of injecting electrons into the light-emitting unit adjacent to the anode side and injecting holes into the light-emitting unit adjacent to the cathode side.

The first light-emitting unit has an emission spectrum having a peak in the blue wavelength range (430 nm to 480 nm).

It is preferable that the second light-emitting unit has an emission spectrum having one peak which is the maximum intensity in the wavelength range of 460 nm to 530 nm, and an emission spectrum having one peak which is the maximum intensity in the blue-green wavelength range (480 nm to 530 nm).

The third light-emitting unit has an emission spectrum having a peak in the red wavelength range (580 nm to 680 nm) and one peak which is the maximum intensity in the green wavelength range (530 nm to 580 nm).

Now, a light illumination system including, as necessary, the abovementioned pseudo natural light emission member as a pseudo natural light emission member 3 shown in the following embodiment will be described.

In summary, the system is for curing a short-wavelength light curable resin to form a nail art onto an artificial nail or a nail of a fingertip, the system including a short-wavelength light emission member 2 and the pseudo natural light emission member 3, wherein the short-wavelength light emission member 2 has a short-wavelength light emitting source 11 in a casing 10, the casing 10 has inside an opening 15 which allows insertion of the artificial nail or the fingertip, the short-wavelength light emitting source 11 irradiates a short-wavelength light curable resin with short-wavelength light having a wavelength less than 410 nm to cure the short-wavelength light curable resin when the artificial nail or the fingertip is inserted into the casing 10 through the opening 15, wherein the pseudo natural light emission member 3 has a planar light-emitting member 50, and wherein the planar light-emitting member 50 is located outside the casing 10 and is capable of emitting diffusion light. The detail of the light emission system is as stated below.

Figure 2:
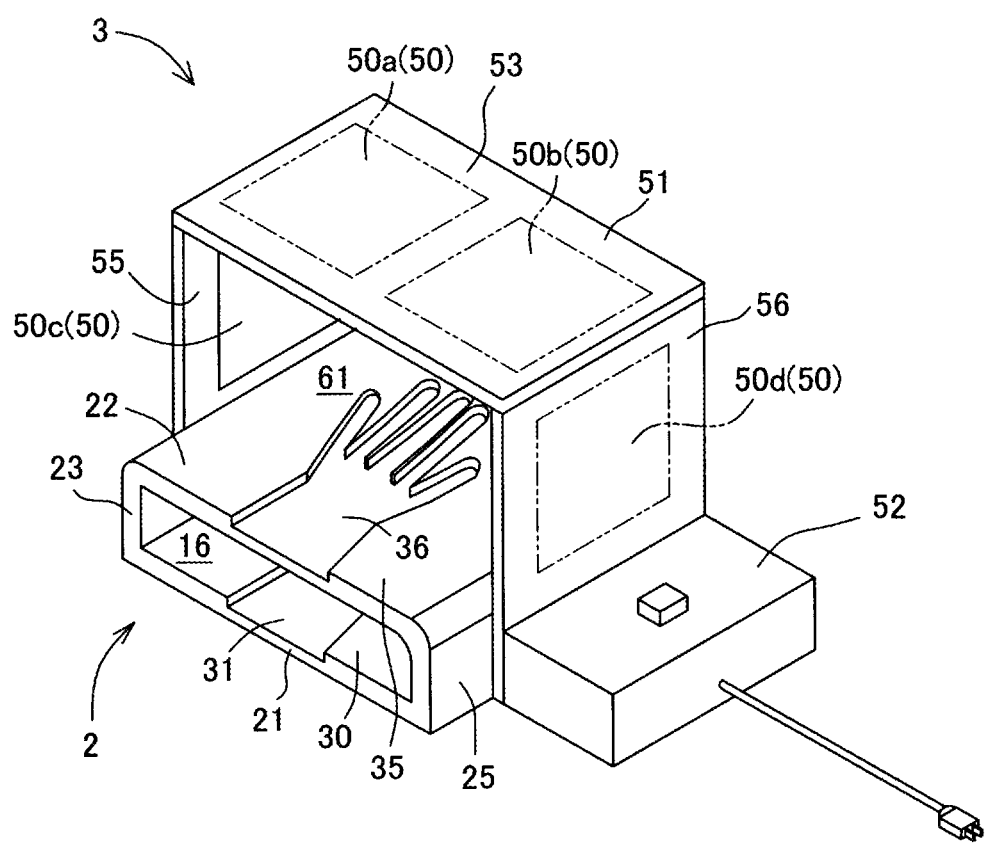
FIG. 2 is a perspective view schematically showing the light emission system shown in FIG. 1.

Hereinafter, embodiments of the present invention will be described in detail. In the following description, unless otherwise specified, the position shown in FIG. 2 is used as a reference. That is, a service receiver 100 side is defined as a front side and a practitioner 101 side is defined as a rear side.

A light emission system 1 according to a first embodiment of the present invention is mainly used in a nail salon, for example. As shown in FIG. 1, the light emission system 1 is used when a practitioner 101 such as a manicurist coats an artificial nail or a nail of a service receiver 100 of nail care with a short-wavelength light curable resin to provide a nail art, such as gel nail, sculpture, nail polish, or gel polish.

An example where a nail art is provided by coating the nail of the service receiver 100 with a short-wavelength light curable resin will be described below.

Figure 3:
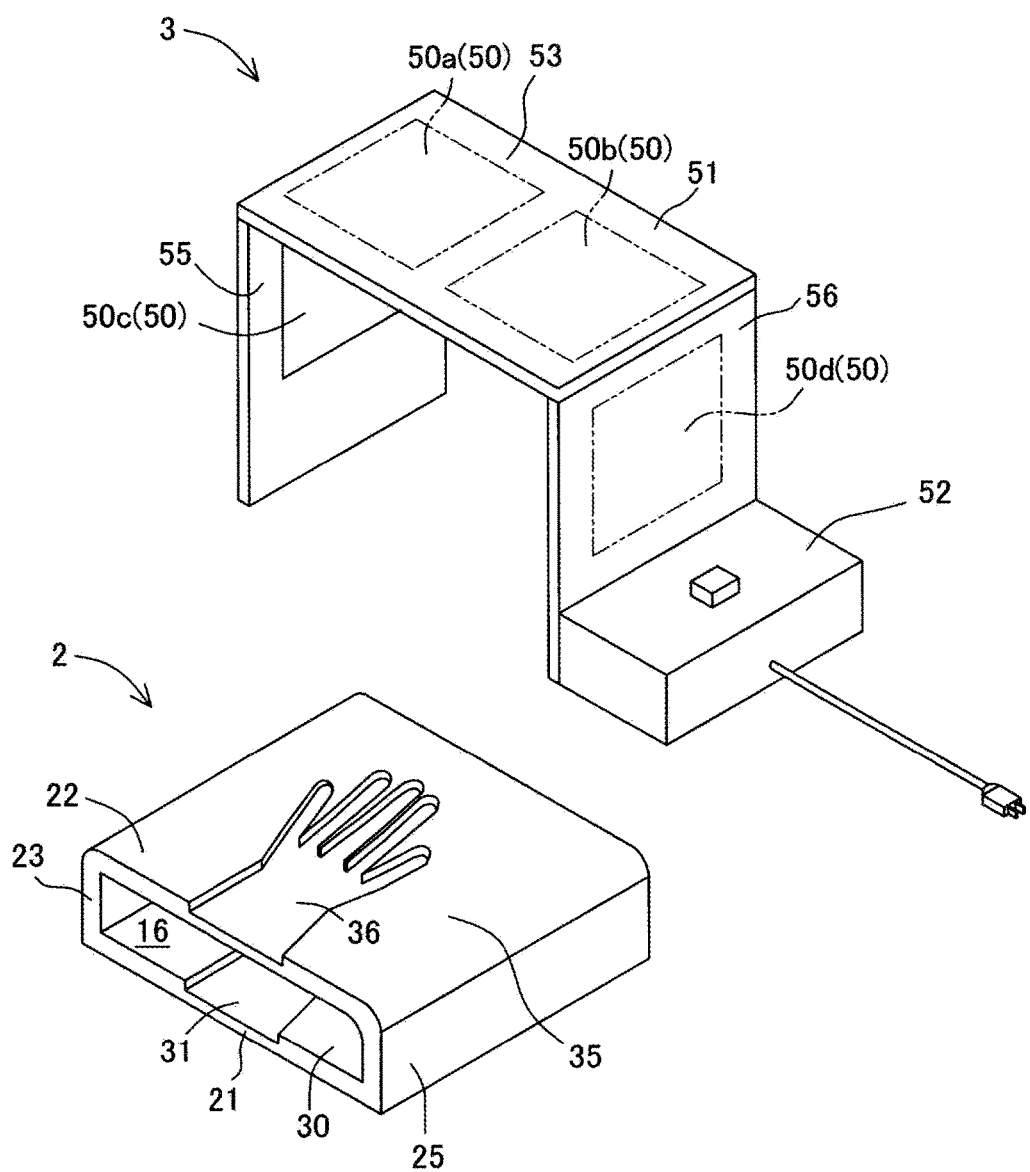
FIG. 3 is an exploded perspective view of the light emission system shown FIG. 2.

As can be seen from FIGS. 2 and 3, the light emission system 1 includes a short-wavelength light emission member 2 and a pseudo natural light emission member 3, wherein the pseudo natural light emission member 3 is attached to the short-wavelength light emission member 2.

Figure 4:
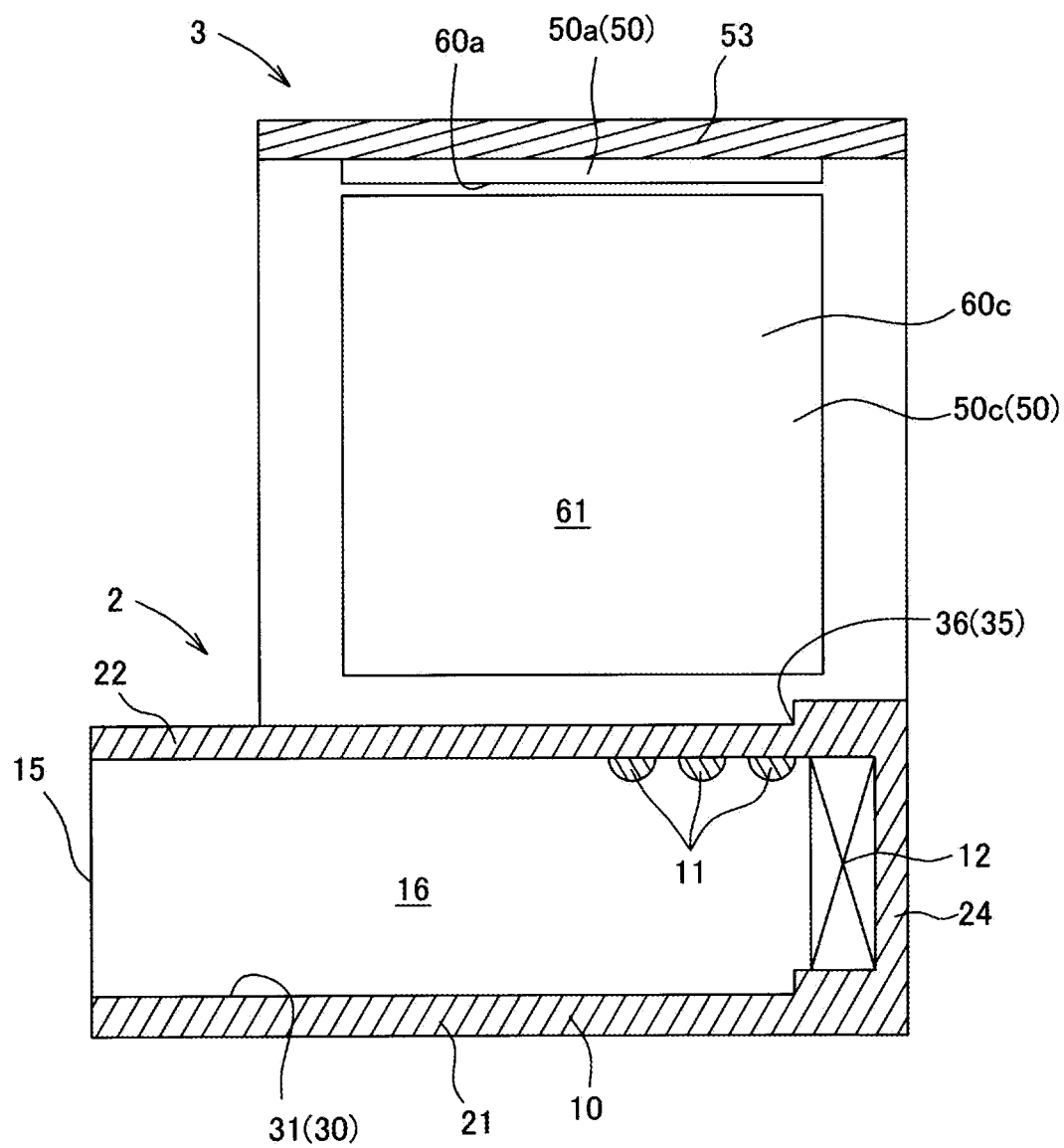
FIG. 4 is a cross-sectional view of the light emission system shown in FIG. 2, showing only main components.

The short-wavelength light emission member 2 irradiates a short-wavelength light curable resin with short-wavelength light for curing the short-wavelength light curable resin. As shown in FIG. 4, the short-wavelength light emission member 2 includes, as main components, a short-wavelength light emitting source 11 (hereinafter also simply referred to as a short-wavelength light source 11) and a drying unit 12 inside a casing 10.

The casing 10 is a box-shaped body having an opening 15 into which at least the fingertip of the service receiver 100 can be inserted. As can be seen from FIGS. 3 and 4, the casing 10 has a curing space 16 thereinside, and this curing space 16 is enclosed by a bottom face forming part 21, a top face forming part 22, and lateral face forming parts 23, 24, and 25.

The curing space 16 is used for curing the short-wavelength light curable resin. As shown in FIG. 4, the curing space 16 communicates with an outside via the opening 15, and is an insertion space which can receive the fingertip of the service receiver 100 through the opening 15.

The bottom face forming part 21 is a wall portion constituting the bottom face of the casing 10, and has an inner placement portion 30 on its inner surface.

The inner placement portion 30 is located inside the casing 10 such that the fingertip of the service receiver 100 can be placed thereon. The inner placement portion 30 is provided with a hand-shaped recessed section 31, and the fingertips of the service receiver can be fixed into the recessed section 31. That is, the fingertips of the service receiver 100 can be fitted in the recessed section 31.

As can be seen from FIGS. 3 and 4, the top face forming part 22 is a wall portion constituting the top face of the casing 10 and facing the bottom face forming part 21 across the curing space 16 in the vertical direction. The top face forming part 22 has an outer placement portion 35 on its outer surface.

The outer placement portion 35 is a portion on which the fingertip of the service receiver 100 can be placed, and also functions as a work table for the practitioner 101. The outer placement portion 35 is provided with a hand-shaped recessed section 36, and the fingertips of the service receiver 100 can be fixed into the recessed section 36. That is, the fingertips of the service receiver 100 can be fitted in the recessed section 36.

The lateral face forming parts 23, 24, and 25 are wall portions connecting the bottom face forming part 21 and the top face forming part 22.

The casing 10 is provided with the opening 15 on the front as viewed from the service receiver 100.

The opening 15 is a communication opening which allows communication between the curing space 16 inside the casing 10 and the outside, and is defined by front end faces of the forming parts 21, 22, 23, and 25. The opening 15 allows insertion of the fingertip of the service receiver 100 therethrough.

The short-wavelength light source 11 can emit short-wavelength light toward the inner placement portion 30 as irradiation light. The short-wavelength light source 11 can emit the irradiation light several times per second from a flash lamp being used as a light source.

The irradiation light emitted from the short-wavelength light source 11 is short-wavelength light which can cure the short-wavelength light curable resin. The irradiation light emitted from the short-wavelength light source 11 is preferably short-wavelength light having a wavelength less than 410 nm, more preferably ultraviolet light having a wavelength less than 350 nm.

The irradiation light emitted from the short-wavelength light source 11 in the present embodiment is ultraviolet light having a wavelength less than 350 nm.

It is preferable that the short-wavelength light source 11 emits irradiation light two times or more and a hundred times or less per second. Within this range, the short-wavelength light source 11 can emit irradiation light without applying an excessive load to the flash lamp serving as the light source.

The short-wavelength light source 11 is preferably capable of emitting irradiation light having a total irradiation energy of 0.1 J/cm$^2$ or more and 5.0 J/cm$^2$ or less. If the energy is within this range, a time for curing the short-wavelength light curable resin can be shortened while preventing low temperature burns, when the fingertip of the service receiver 100 is placed on the inner placement portion 30.

The drying unit 12 dries the inside of the curing space 16 and volatilizes a solvent component in the short-wavelength light curable resin.

Figure 5:
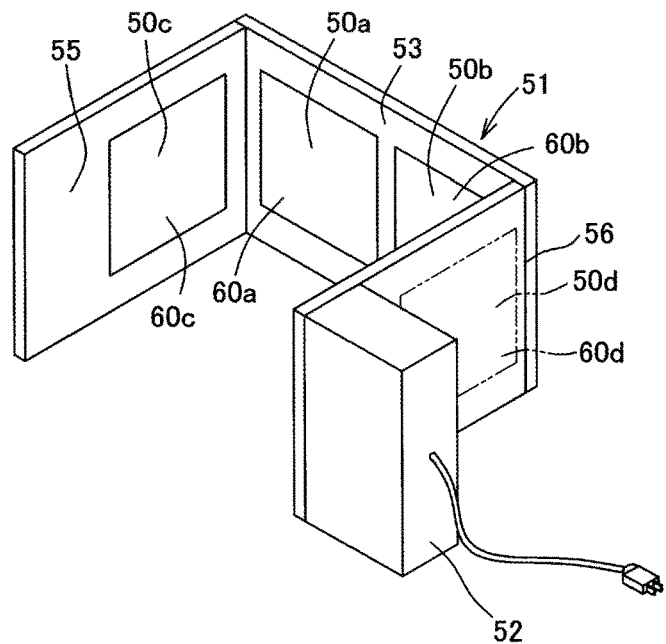
FIG. 5 is a perspective view of a pseudo natural light emission member shown in FIG. 3 as viewed from another direction.
Figure 6:
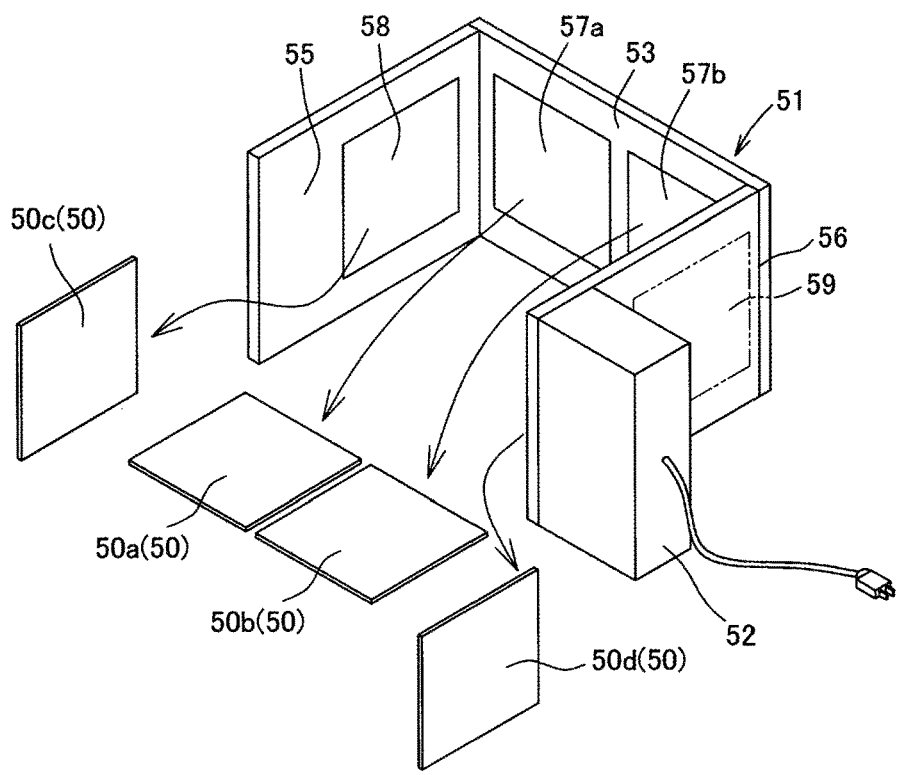
FIG. 6 is an exploded perspective view of the pseudo natural light emission member shown in FIG. 5.

The pseudo natural light emission member 3 reproduces and emits pseudo natural light, and includes planar light-emitting members 50 (50a to 50d) (planar light sources), a fixing member 51, and a control device 52 as main components, as can be seen from FIGS. 5 and 6.

The planar light-emitting members 50 are planar light-emitting light sources that widely emit light and emit diffusion light, and they are circular or polygonal plate members. The planar light-emitting members 50 in the present embodiment are rectangular organic EL panels.

The diffusion light emitted from the planar light-emitting members 50 is preferably white light having a general color rendering index Ra of 80 or more according to JIS Z 8726.

The planar light-emitting members 50 are capable of emitting diffusion light not including an emission spectrum in a wavelength range of less than 350 nm and 1000 nm or more. That is, the irradiation light from the planar light-emitting members 50 has only the emission spectrum in the wavelength range of 350 nm or more and less than 1000 nm. The planar light-emitting members 50 have magnetic force generating units so as to be attachable/detachable to/from fixing parts 57a, 57b, 58, and 59 of the fixing member 51.

The fixing member 51 has substantially an angular C-shape as viewed from front, and includes a main body 53 (facing portion) and legs 55 and 56 as shown in FIG. 5.

The main body 53 is a plate-shaped portion extending in the lateral direction, and has, on its lower surface, fixing parts 57a and 57b to which the planar light-emitting members 50a and 50b can be fixed. The fixing parts 57a and 57b are plate members made of a magnetic material and are capable of supporting the planar light-emitting members 50a and 50b by magnetic force between the planar light-emitting members 50a and 50b and the fixing parts 57a and 57b.

The length of the main body 53 in the front-rear direction is preferably 5 cm or more and 15 cm or less. If the length is within this range, the fingertip of the service receiver 100 or the like is less likely to be hidden by the main body 53 during the treatment, and the main body 53 is less likely to interfere.

The leg 55 is an elongated plate-shaped portion extending downward in the vertical direction from one of lengthwise ends of the main body 53. The leg 55 has, on its inner surface, the fixing part 58 on which the planar light-emitting member 50c can be fixed.

The leg 56 is an elongated plate-shaped portion extending in the same direction as the extending direction of the leg 55 from the other lengthwise end of the main body 53. The leg 56 has, on its inner surface, the fixing part 59 on which the planar light-emitting member 50d can be fixed at a position facing the fixing part 58 of the leg 55.

The fixing parts 58 and 59 are both plate members made of a magnetic material and are capable of supporting the planar light-emitting members 50c and 50d by magnetic force between the planar light-emitting members 50c and 50d and the fixing parts 58 and 59.

The control device 52 turns on or off the planar light-emitting members 50a to 50d, and also serves as a power supply device that supplies electric power to the planar light-emitting members 50a to 50d.

The short-wavelength light curable resin is a curable resin in the form of a gel, and has fluidity before being applied. The short-wavelength light curable resin is a curable resin that cures by irradiation light from the short-wavelength light source 11 but does not substantially cure by irradiation light from the planar light-emitting members 50a to 50d.

The wording "not substantially cure by the irradiation light" referred to herein indicates that 98% or more of all components do not cure when being irradiated with irradiation light from the planar light-emitting members 50a to 50d.

The short-wavelength light curable resin is an ultraviolet curable resin that cures by ultraviolet light, and in the present embodiment, it cures by being irradiated with light containing light having a wavelength less than 350 nm.

Subsequently, the positional relationship of the components of the light emission system 1 in the present embodiment will be described.

The pseudo natural light emission member 3 covers the outside of the short-wavelength light emission member 2 as shown in FIG. 2. The main body 53 of the pseudo natural light emission member 3 is located above the outer placement portion 35 of the short-wavelength light emission member 2 so as to face the outer placement portion 35. A coating space 61 is formed between the main body 53 and the outer placement portion 35. The practitioner 101 can apply the short-wavelength light curable resin to the nail of the service receiver 100 in the coating space 61.

The short-wavelength light emission member 2 is positioned between the legs 55 and 56 of the pseudo natural light emission member 3, and the legs 55 and 56 face the lateral face forming parts 23 and 25. A part of the short-wavelength light emission member 2 projects forward (toward the service receiver 100) from the inside of the pseudo natural light emission member 3.

The two planar light-emitting members 50a and 50b are fixed to the fixing parts 57a and 57b in such a way that emission surfaces 60a and 60b face downward in the vertical direction. That is, the planar light-emitting members 50a and 50*b* are directed to the coating space 61 so as to be capable of irradiating the outer placement portion 35 with diffusion light. The planar light-emitting members 50*c* and 50*d* are fixed to the fixing parts 58 and 59 of the legs 55 and 56 such that emission surfaces 60*c* and 60*d* thereof are directed to the coating space 61. That is, the planar light-emitting members 50*c* and 50*d* face each other so as to be capable of irradiating the outer placement portion 35 with diffusion light.

The direction of the emission surfaces 60*c* and 60*d* of the planar light-emitting members 50*c* and 50*d* is different from the direction of the emission surfaces 60*a* and 60*b* of the planar light-emitting members 50*a* and 50*b*. That is, the direction orthogonal to the emission surfaces 60*c* and 60*d* of the planar light-emitting members 50*c* and 50*d* is not parallel to but intersects or is twisted relative to the direction orthogonal to the emission surfaces 60*a* and 60*b* of the planar light-emitting members 50*a* and 50*b*. The control device 52 is mounted to the leg 56 which is one of the legs. The control device 52 is capable of controlling the planar light-emitting members 50*a* to 50*d* such that they emit light, through wiring lines, not shown, inside the fixing member 51.

Subsequently, a usage example of the light emission system 1 according to the present embodiment will be described. An example where a nail art is provided to the nail of the service receiver 100 will be described below.

First, the practitioner 101 is seated so as to face the service receiver 100 across the light emission system 1, and turns on the power source of the control device 52 to light the planar light-emitting members 50*a* to 50*d*.

At this time, the planar light-emitting members 50*a* and 50*b* emit diffusion light toward the outer placement portion 35, and the planar light-emitting members 50*c* and 50*d* emit diffusion light toward the outer placement portion 35 in a direction intersecting the emission direction of the planar light-emitting members 50*a* and 50*b*.

Thereafter, the practitioner 101 performs an coating step and a curing step to provide a desired nail art to the nail of the service receiver 100.

Figure 7A:
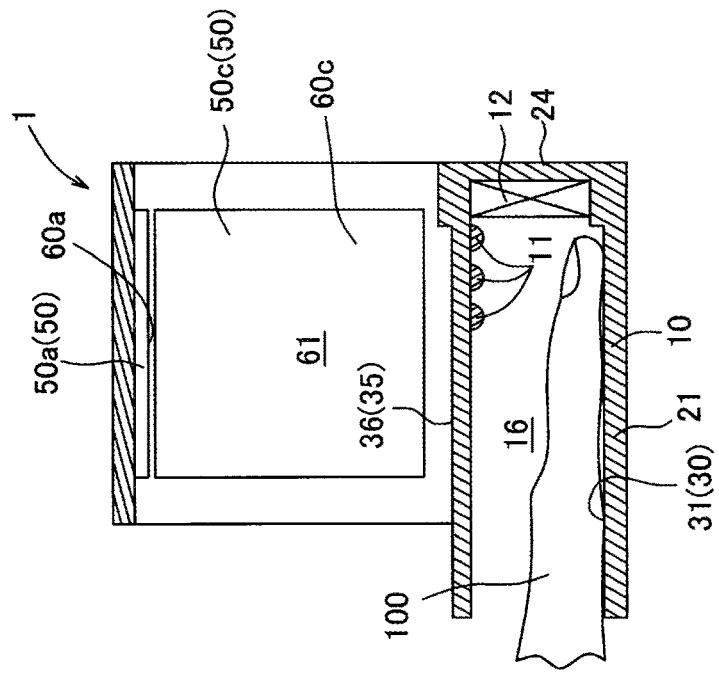

First, as shown in FIG. 7A, the practitioner 101 asks the service receiver 100 to place his/her fingertip into the recessed section 36, applies light from the pseudo natural light emission member 3, and selects an appropriate short-wavelength light curable resin for the skin color of the service receiver 100. Then, the practitioner 101 coats a desired area of the nail of the service receiver 100 (coating step) with the selected short-wavelength light curable resin in the form of a gel.

At this time, the planar light-emitting members 50*a* and 50*b* are located on a projection plane in the vertical direction of the fingertips of the service receiver 100 and the hand of the practitioner 101, and the planar light-emitting members 50*c* and 50*d* are located on a projection plane in a horizontal direction of the fingertips of the service receiver 100 and the hand of the practitioner 101. That is, the fingertips of the service receiver 100 and the hand of the practitioner 101 are irradiated with light from different directions from planar light-emitting members 50*a* to 50*d*. In the present embodiment, the fingertips of the service receiver 100 and the hand of the practitioner 101 are irradiated with diffusion light from three directions, and shadows hardly appear near the fingertips of the service receiver 100 and the hand of the practitioner 101. Further, the fingertips of the service receiver 100 and the hands of the practitioner 101 are illuminated with diffusion light having high color rendering properties from the planar light-emitting members 50*a* to 50*d*, so that they are illuminated with soft light like sunlight. Therefore, the practitioner 101 can see the substantially actual color of the short-wavelength light curable resin on the nail of the fingertip of the service receiver 100.

Figure 7B:
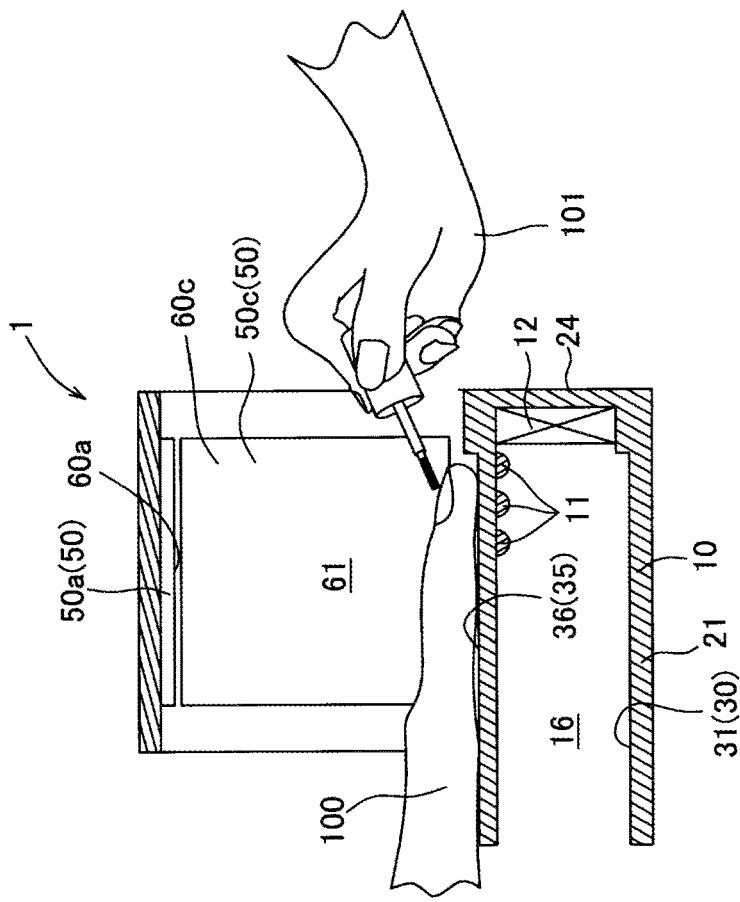

After coating the desired area of the nail of the service receiver 100 with the desired short-wavelength light curable resin, the practitioner 101 asks the service receiver 100 to insert his/her fingertips into the casing 10 through the opening 15 of the short-wavelength light emission member 2 and place his/her fingertips into the recessed section 31 of the inner placement portion 30, as shown in FIG. 7B. Then, the practitioner 101 drives the short-wavelength light emission member 2 to irradiate the short-wavelength light curable resin covering the nail of the service receiver 100 on the inner placement portion 30 with short-wavelength light and dries the short-wavelength light curable resin. Thus, the short-wavelength light curable resin is hardened, and nail coating is formed (curing step).

Then, when the nail coating is provided and the curing step is finished, the coating step is carried out again as necessary. Specifically, the practitioner 101 places the fingertips of the service receiver 100 in the recessed section 36, selects a short-wavelength light curable resin according to the skin color of the service receiver 100 or the color of the nail covering the nail, and coats a desired area of the nail or nail coating of the service receiver 100 with the selected short-wavelength light curable resin.

The coating step and the curing step described above are alternately repeated to provide nail coating of the nail of the service receiver 100, and thus, a desired nail art is provided.

According to the light emission system 1 in the first embodiment, an organic EL panel having high color rendering properties are used for the planar light-emitting members 50*a* to 50*d*. Therefore, the practitioner 101 can easily identify the actual skin color of the service receiver 100 under natural light, and hence can select the color of the short-wavelength light curable resin according to the skin color of the service receiver 100 with little hesitation. That is, the light emission system 1 can provide a high actual color decorativeness.

According to the light emission system 1 in the first embodiment, the diffusion light emitted from the planar light-emitting members 50*a* to 50*d* does not include a wavelength spectrum in the wavelength range of less than 350 nm and 1000 nm or more, so that the short-wavelength light curable resin is hard to cure during the coating step. That is, the light emission system 1 according to the first embodiment can provide a high performance for preventing curing during decoration. The light emission system 1 can also reduce eye fatigue of the practitioner 101 or the service receiver 100 caused by the short-wavelength light, and can prevent heating due to long-wavelength light, as compared to the conventional cases. Therefore, the practitioner 101 can comfortably provide the treatment, and the service receiver 100 can comfortably receive the treatment. In other words, the light emission system 1 in the first embodiment can exhibit high comfortable decorativeness.

According to the light emission system 1 in the first embodiment, the hands of the practitioner 101 and the fingertips of the service receiver 100 are illuminated by the plurality of planar light-emitting members 50*a* to 50*d* during the coating step, so that shadows are less likely to appear near the hand of the practitioner 101 and the fingertip of the service receiver 100. Thus, the practitioner 101 can easily perform the treatment.

According to the light emission system 1 in the first embodiment, the curing space 16 and the coating space 61 are different spaces and close to each other, whereby the service receiver 100 can insert fingertips of one hand into the coating space 61 while inserting the fingertips of the other hand into the curing space 16. Therefore, while the short-wavelength light curable resin is applied onto the nail of the finger on the right hand of the service receiver 100, the short-wavelength light curable resin applied to the nail of the finger on the left hand can be cured. Thus, according to the light emission system 1, the treatment time can be shortened.

According to the light emission system 1 in the first embodiment, when a short-wavelength light curable resin is applied onto the body to be decorated such as the artificial nail or the nail of the fingertip, the coating condition and color of the short-wavelength light curable resin can be easily identified.

According to the pseudo natural light emission member in the first embodiment, under white light close to the natural light, an animal skin color or a human skin color can be reproduced.

Figure 8:
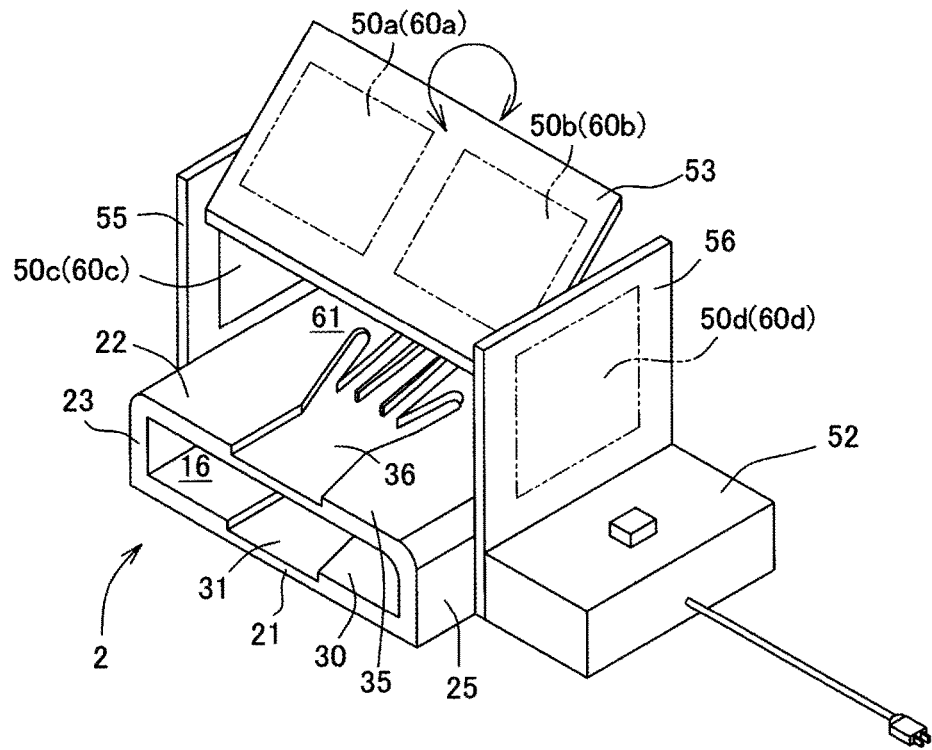
FIG. 8 is a perspective view of a light emission system according to another embodiment of the present invention.

In the embodiment described above, the main body 53 is connected to the legs 55 and 56 so as to be supported in a non-rotatable manner. However, the present invention is not limited thereto. As shown in FIG. 8, the main body 53 may be supported to the legs 55 and 56 in a rotatable manner.

In the above embodiment, the emission surfaces 60a and 60b of the planar light-emitting members 50a and 50b are oriented in the vertical direction. However, the present invention is not limited thereto. The emission surfaces 60a and 60b of the planar light-emitting members 50a and 50b may be inclined in a direction intersecting the vertical direction. In this case, it is preferable that the emission surfaces 60a and 60b of the planar light-emitting members 50a and 50b are inclined toward the practitioner 101.

Figure 9:
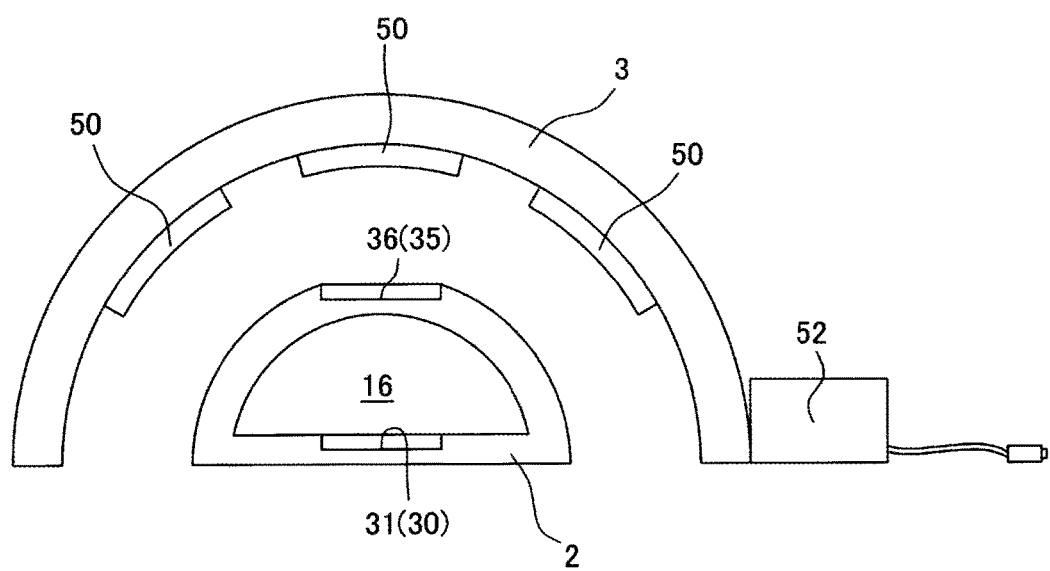
FIG. 9 is a front view of the light emission system according to further another embodiment of the present invention.

In the above embodiment, the fixing member 51 has an angular C shape when viewed from front. However, the present invention is not limited thereto. The fixing member 51 may have an arc shape. That is, the main body 53 and the legs 55 and 56 may form a continuous arc as shown in FIG. 9.

In this case, it is preferable that the planar light-emitting member 50 is a flexible organic EL panel having a flexible substrate as a supporting substrate.

In the above embodiment, the recessed section 36 is formed in the outer placement portion 35. However, the present invention is not limited thereto. The outer placement portion 35 may not be formed with the recessed section 36. Similarly, the present invention is not limited to the configuration where the recessed section 31 is formed in the inner placement portion 30. The inner placement portion 30 may not be formed with the recessed section 31.

Figure 10:
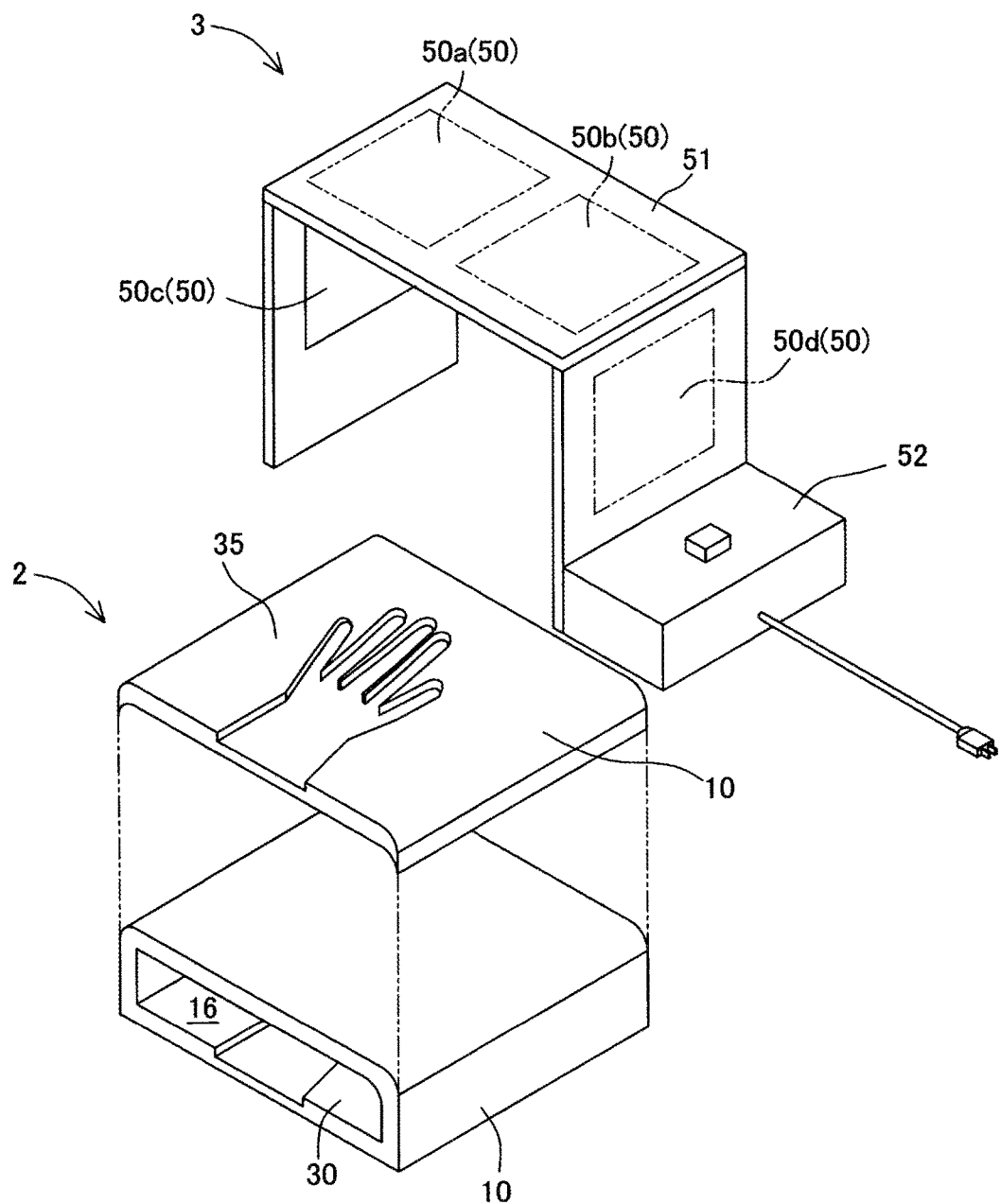
FIG. 10 is an exploded perspective view of the light emission system according to further another embodiment of the present invention.
Figure 11A:
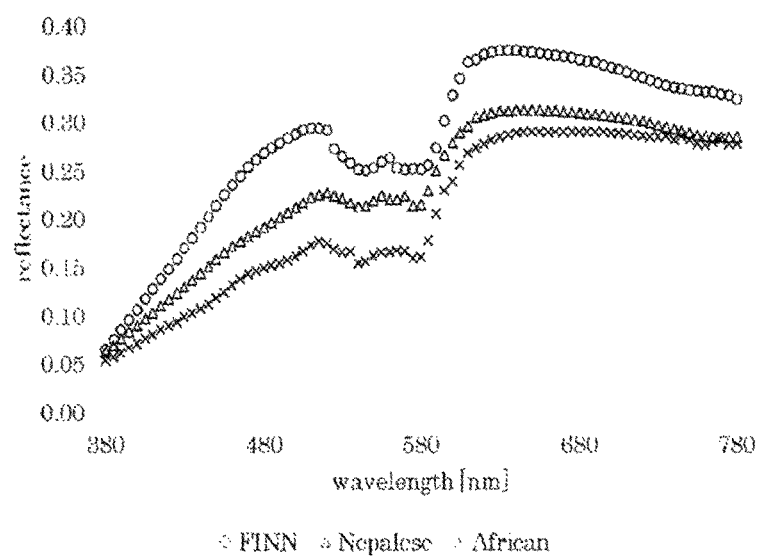
FIG. 11A is a graph showing reflection spectra of palms of Finnish (Caucasian): ○, Nepalese (Asian): Δ, and African (Black): x, wherein data items in K. S. Bersha et al., SPECTRAL IMAGING AND Data of ANALYSIS OF HUMAN SKIN (Univ. Eastern Finland June 2010, CIMET) are plotted.
Figure 11B:
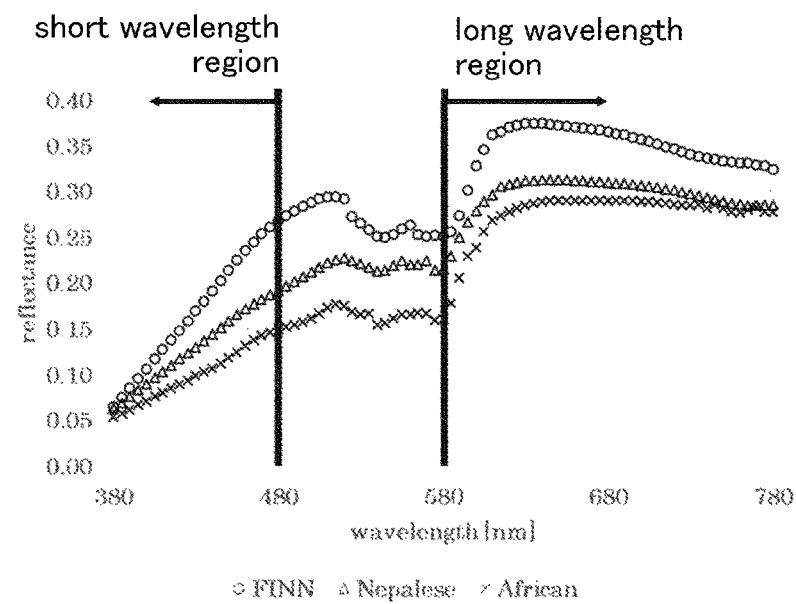
FIG. 11B is a graph obtained by adding boundaries of wavelength regions to the graph in FIG. 11A.
Figure 12A:
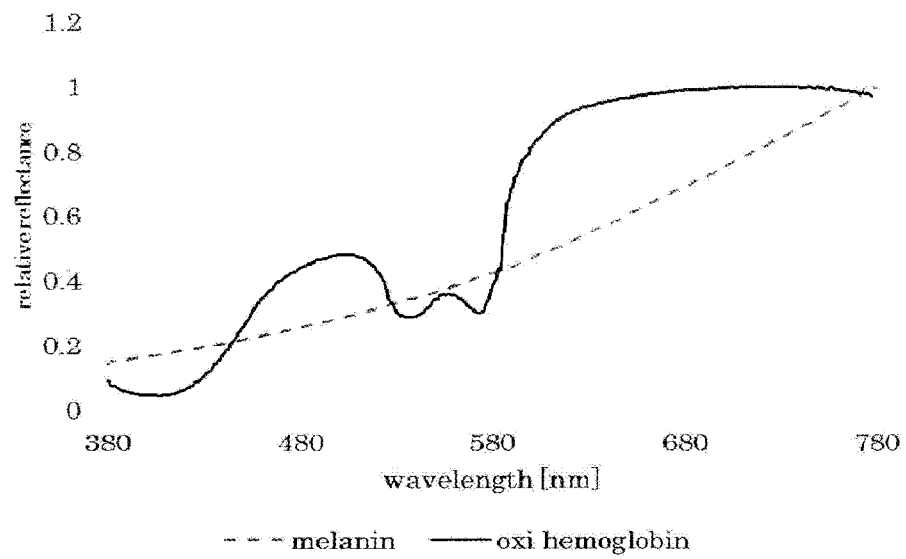
FIG. 12A shows relative reflectance spectra of oxygenated hemoglobin (solid line) and melanin (broken line)
Figure 12B:
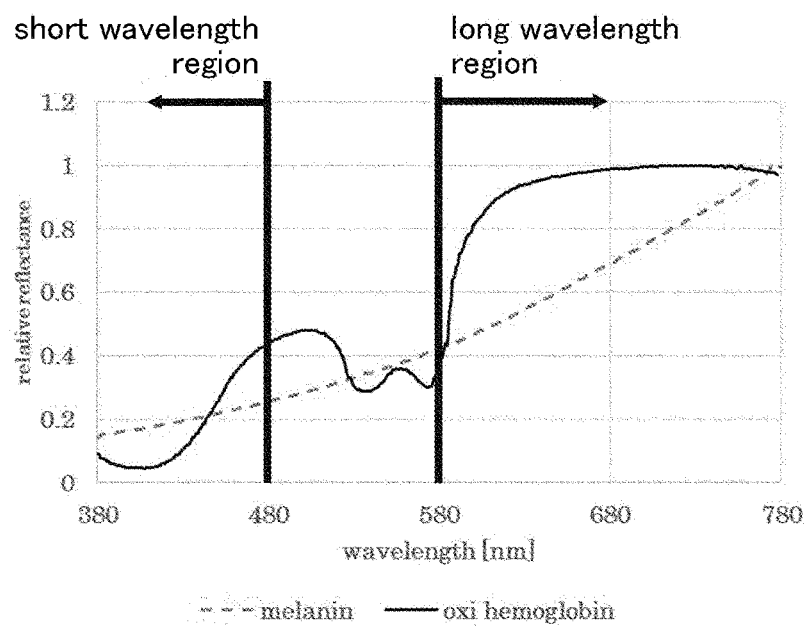
FIG. 12B is a graph obtained by adding boundaries of wavelength regions to the graph in FIG. 12A.

In the above embodiment, a part of the top face forming part 22 of the casing 10 functions as the outer placement portion 35 on which the fingertip of the service receiver 100 is placed. However, the present invention is not limited thereto. The outer placement portion 35 and the casing 10 may be separately provided. For example, a placement member 70 that is separate from the casing 10 and has the outer placement portion 35 may be prepared, and the placement member 70 may be placed on the casing 10, as shown in FIG. 10.

In the above embodiment, the two planar light-emitting members 50a and 50b are provided to the main body 53. However, the present invention is not limited thereto. A single planar light-emitting member 50 may be provided to the main body 53 or three or more planar light-emitting members 50 may be provided.

Similarly, while a single planar light-emitting member 50 is provided to each of the legs 55 and 56 in the above-described embodiment, the present invention is not limited thereto. Three or more planar light-emitting members 50 may be provided to each of the legs 55 and 56.

In the above embodiment, a plurality of planar light-emitting members 50 are aligned in the longitudinal direction of the main body 53. However, the present invention is not limited thereto. The planar light-emitting members 50 may be aligned in multiple rows in the longitudinal direction of the main body 53.

In the above embodiment, a nail art is provided with the nail of the service receiver 100 being inserted into the curing space 16 or the coating space 61. However, the present invention is not limited thereto. A nail art may be provided with only an artificial nail such as sculpture being inserted into the curing space 16 or the coating space 61.

In the above embodiment, the short-wavelength light emission member 2 and the pseudo natural light emission member 3 are integrally attached. However, the present invention is not limited thereto, and the short-wavelength light emission member 2 and the pseudo natural light emission member 3 may be attached in a detachable manner.

In the above embodiment, the outer placement portion 35 is formed on the top face of the top face forming part 22 which is the outer face of the casing 10. However, the present invention is not limited thereto. The outer placement portion 35 may be formed on the lateral face forming parts 23 and 25.

In the above embodiment, the short-wavelength light curable resin is cured to form a nail art as a decorative object on the nail which is the body to be decorated (target body). However, the present invention is not limited thereto. The body to be decorated may be other than the nail, and the decorative object may be other than the nail art.

The body to be decorated may be, for example, an accessory such as a necklace or a ring. The decorative object may be beads, for example.

In the above embodiment, the pseudo natural light emission member is used for identifying the color of the nail art. However, the present invention is not limited thereto. The pseudo natural light emission member can be used not only for identifying the color of the nail art but also for recognizing an animal skin color or a human skin color in medical institutions.

The components in the above embodiments can be freely replaced or added among the respective embodiments, as long as they are within the technical scope of the present invention.

EXAMPLE

Hereinafter, the present invention will be specifically described with reference to Examples. It should be noted that the present invention is not limited to the following Examples, and can be modified, as appropriate, without departing from the scope of the present invention.

Example 1, Reference Example 1, Reference Example 2

Figure 13:
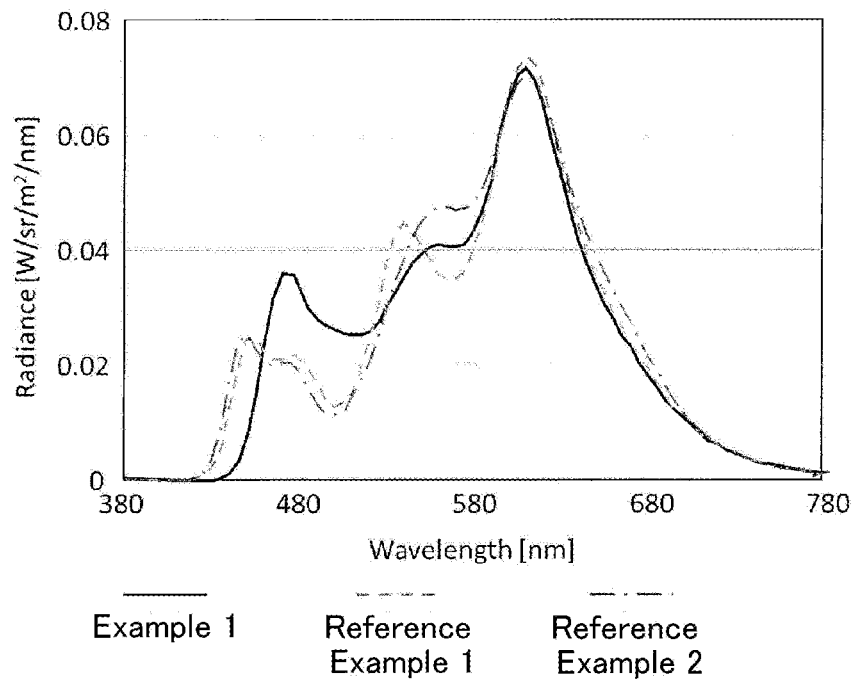
FIG. 13 is a graph showing rated light emission spectra of organic EL panels in Example 1, Reference Example 1, and Reference Example 2.

Organic EL panels in Example 1, Reference Example 1, and Reference Example 2 showing rated light emission spectra illustrated in FIG. 13 were prepared, and interviews were conducted to manicurists about easiness in selecting a nail gel color in a state where the human palm was irradiated with light emitted from the respective panels as illumination light.

The color rendering indices CRI of the respective panels in rating are 86 in Example 1, 91 in Reference Example 1, and 82 in Reference Example 2. That is, these panels have high color rendering properties.

As a result of the interview, some manicurists answered that they could select the nail gel color most easily when the palm was irradiated with light from the organic EL panel in Example 1. Further, some manicurists answered that the palm looked yellowish or amber when being illuminated with light from the organic EL panel in Reference Example 1, and that the palm looked greenish or bluish when being illuminated with light from the organic EL panel in Reference Example 2.

Maximum intensity (MAX) and minimum intensity (MIN) in the wavelength range of 480 to 580 nm, fluctuation range, maximum peak intensity (PEAK) in the wavelength range of 580 to 680 nm, and (Intensity A at 480 nm)/(Intensity B at 580 nm) (hereinafter simply referred to as "A/B") calculated from the light emission spectra in FIG. 13 are as follows.

Note that A is the intensity at 480 nm and B is the intensity at 580 nm.

Example 1: MAX=0.042, MIN=0.026, fluctuation range=0.47, PEAK=0.071, and A/B=0.034/0.042=0.81

That is, in Example 1, the fluctuation range is 0.5 or less, PEAK is larger than MAX, and A/B is 0.8 or more.

Reference Example 1: MAX=0.044, MIN=0.014, fluctuation range=1.03, PEAK=0.074, and A/B=0.021/0.041=0.51

That is, in Reference Example 1, the fluctuation range is more than 0.5, PEAK is larger than MAX, and A/B is less than 0.8.

Reference Example 2: MAX=0.047, MIN=0.011, fluctuation range=1.24, PEAK=0.070, and A/B=0.019/0.049=0.39

That is, in Reference Example 2, the fluctuation range is more than 0.5, PEAK is larger than MAX, and A/B is less than 0.8.

The panels in Example 1, Reference Example 1, and Reference Example 2 have high color rendering properties. However, the fluctuation range in Example 1 is smaller than the fluctuation ranges in Reference Example 1 and Reference Example 2, and the value of A/B in Example 1 is larger than the values of A/B in Reference Example 1 and Reference Example 2. This is considered to be the reason why the panel in Example 1 can provide illumination with higher recognition performance.

Assumed Example 2

Figure 14:
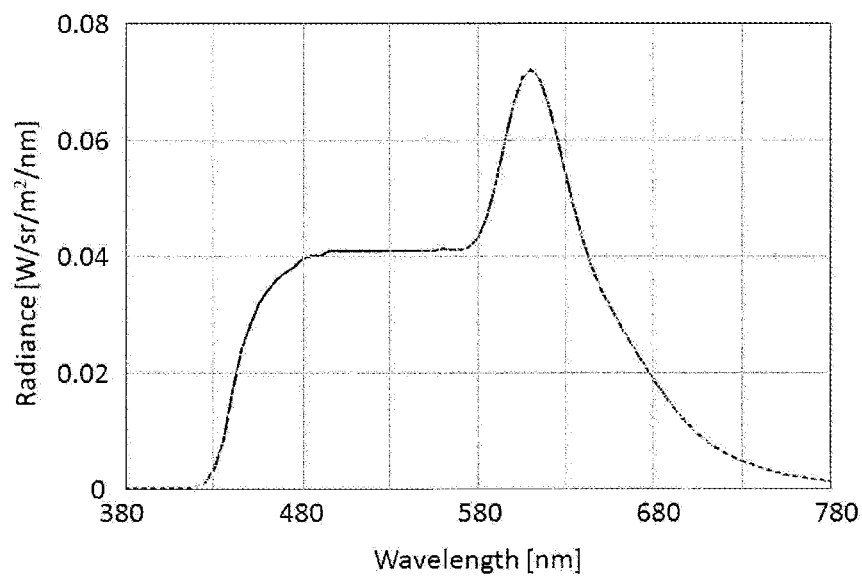
FIG. 14 shows an ideal spectrum for improving a skin color recognition performance.

Illumination is provided by appropriately setting the arrangement or illuminance of a planar light source having a high skin-color recognition performance and a planar light source having a pseudo natural light forming function, or illumination is provided with an organic EL panel including an organic EL element having both a high skin-color recognition function and a pseudo natural light forming function, in order to emit light having an appropriate peak intensity and peak width. It is preferable that, with such configuration, a spectrum as close to the ideal spectrum shown in FIG. 14 as possible is obtained from the viewpoint of a recognition performance. When light is designed with a synthetic spectrum using a reaction field in two or more kinds of light sources or organic EL elements, the light is preferably designed to have a peak in a blue range from the viewpoint of reducing a manufacturing cost. It is considered that, according to the above configuration, white light having a high recognition performance and similar to natural light can be emitted.

EXPLANATION OF REFERENCE CHARACTERS

1: Light emission system
2: Short-wavelength light emission member
3: Pseudo natural light emission member
10: Casing
11: Short-wavelength light emitting source
15: Opening
35: Outer placement portion (placement portion)
50, 50a to 50d: planar light-emitting member (planar light source)
53: Main body (facing portion)
61: Coating space
100: Service receiver
101: Practitioner

The invention claimed is:

1. A light emission system for curing a short-wavelength light curable resin to constitute nail art onto an artificial nail or a nail on a fingertip, the system comprising: a short-wavelength light emission member; and a pseudo natural light emission member,
   wherein the short-wavelength light emission member includes a casing having a short-wavelength light emitting source therein, the casing having an opening that allows insertion of the artificial nail or the fingertip thereinto,
   wherein the short-wavelength light emitting source is configured to irradiate the short-wavelength light curable resin with a short-wavelength light to cure the resin when the artificial nail or the fingertip is inserted into the casing through the opening,
   the resin covering the artificial nail or the fingertip,
   the short-wavelength light having a wavelength less than 410 nm, and
   wherein the pseudo natural light emission member has a planar light source located outside the casing, the planar light source being configured to emit diffusion light.

2. The light emission system according to claim 1,
   wherein the casing has on its outer surface a placement portion that allows the artificial nail or the fingertip to be placed, and
   wherein the planar light source is configured to irradiate the artificial nail or the nail on the fingertip with diffusion light when the artificial nail or the fingertip is placed on the placement portion.

3. The light emission system according to claim 1,
   wherein the pseudo natural light emission member comprises at least two of the planar light sources including a first and a second planar light sources, and
   wherein the first planar light source is configured to irradiate the short-wavelength light curable resin with diffusion light from a direction different from an irradiation direction of the second planar light source.

4. The light emission system according to claim 1, wherein the planar light source has a general color rendering index Ra of 80 or more according to JIS Z 8726.

5. The light emission system according to claim 1,
   wherein the short-wavelength light curable resin is an ultraviolet light curable resin, and wherein diffusion light from the planar light source does not include light having a wavelength less than 350 nm, and equal to or more than 1000 nm.

6. The light emission system according to claim 1, wherein the short-wavelength light curable resin is an ultraviolet light curable resin, and
wherein the short-wavelength light emitting source is configured to emit ultraviolet light having a wavelength less than 350 nm.

7. The light emission system according to claim 1, wherein the casing has thereon or thereabove a placement portion that allows the artificial nail or the fingertip to be placed,
wherein the pseudo natural light emission member has a facing portion that faces the placement portion across a space,
wherein the facing portion supports the planar light source,
wherein the space allows insertion of the artificial nail or the fingertip, and
wherein the planar light source is configured to irradiate the artificial nail or the fingertip with diffusion light when the artificial nail or the fingertip is inserted into the space.

8. The light emission system according to claim 7, wherein the pseudo natural light emission member comprises: at least two of the planar light sources including a first and a second planar light sources; the facing portion; and a leg that supports the facing portion,
the facing portion supporting the first planar light source,
the leg supporting the second planar light source,
the first and the second planar light sources being configured to irradiate the artificial nail or the nail on the fingertip with diffusion light when the artificial nail or the fingertip is inserted into the space.

9. The light emission system according to claim 7, wherein the planar light source is detachable from and attachable to the facing portion.

10. A light emission system for curing a short-wavelength light curable resin to constitute a decorative object onto a target body, the system comprising: a short-wavelength light emission member; and a pseudo natural light emission member,
wherein the short-wavelength light emission member includes a casing having a short-wavelength light emitting source therein, the casing having an opening that allows insertion of the target body thereinto,
wherein the short-wavelength light emitting source is configured to irradiate the short-wavelength light curable resin with a short-wavelength light to cure the resin when the target body is inserted into the casing through the opening, the resin covering the target body, the short-wavelength light having a wavelength less than 410 nm, and
wherein the pseudo natural light emission member has a planar light source located outside the casing, the planar light source being configured to emit diffusion light.

11. The light emission system according to claim 1, wherein the pseudo natural light emission member is configured to irradiate an animal skin or a human skin with light, the light having a synthetic spectrum obtained by synthesizing an identification spectrum and a pseudo natural light forming spectrum,
wherein the identification spectrum has a maximum intensity MAX and a minimum intensity MIN in a blue-green to green wavelength range of 480 nm to 580 nm,
wherein the identification spectrum has a fluctuation range of an irradiation intensity represented by the following (Expression 1) not more than 0.5,
wherein the pseudo natural light forming spectrum has one peak in a blue wavelength range of 430 nm to 480 nm and another peak in a red wavelength range of 580 nm to 680 nm, and
wherein a maximum peak intensity PEAK in the red wavelength range satisfies the following (Expression 2):

[Equation 1]

$$\text{Fluctuation range} = 2 \times (\text{MAX} - \text{MIN})/(\text{MAX} + \text{MIN}) \quad \text{(Expression 1); and}$$

[Equation 2]

$$\text{PEAK} > \text{MAX} \quad \text{(Expression 2).}$$

12. A light emission system comprising a pseudo natural light emission member including one or more planar light sources, the planar light source being configured to emit diffusion light,
wherein the pseudo natural light emission member is configured to irradiate an animal skin or a human skin with light, the light having a synthetic spectrum obtained by synthesizing an identification spectrum and a pseudo natural light forming spectrum,
wherein the identification spectrum has a maximum intensity MAX and a minimum intensity MIN in a blue-green to green wavelength range of 480 nm to 580 nm,
wherein the identification spectrum has a fluctuation range of an irradiation intensity represented by the following (Expression 1) not more than 0.5,
wherein the pseudo natural light forming spectrum has one peak in a blue wavelength range of 430 nm to 480 nm and another peak in a red wavelength range of 580 nm to 680 nm, and
wherein a maximum peak intensity PEAK in the red wavelength range satisfies the following (Expression 2):

[Equation 3]

$$\text{Fluctuation range} = 2 \times (\text{MAX} - \text{MIN})/(\text{MAX} + \text{MIN}) \quad \text{(Expression 1); and}$$

[Equation 4]

$$\text{PEAK} > \text{MAX} \quad \text{(Expression 2).}$$

* * * * *